Jan. 5, 1943.  F. M. WHITE  2,307,439
SPRING SUSPENSION FOR RAILWAY TRUCKS
Filed June 21, 1940
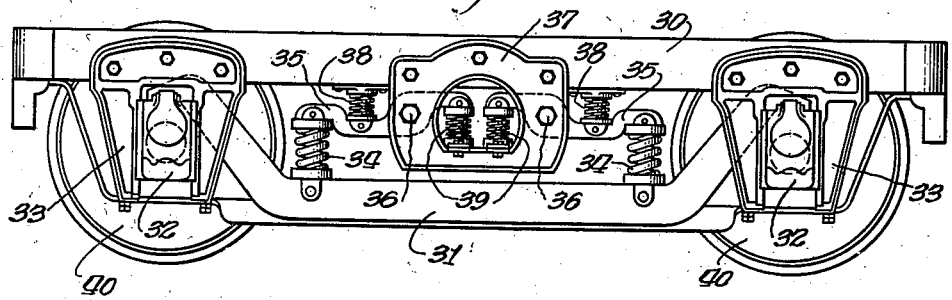
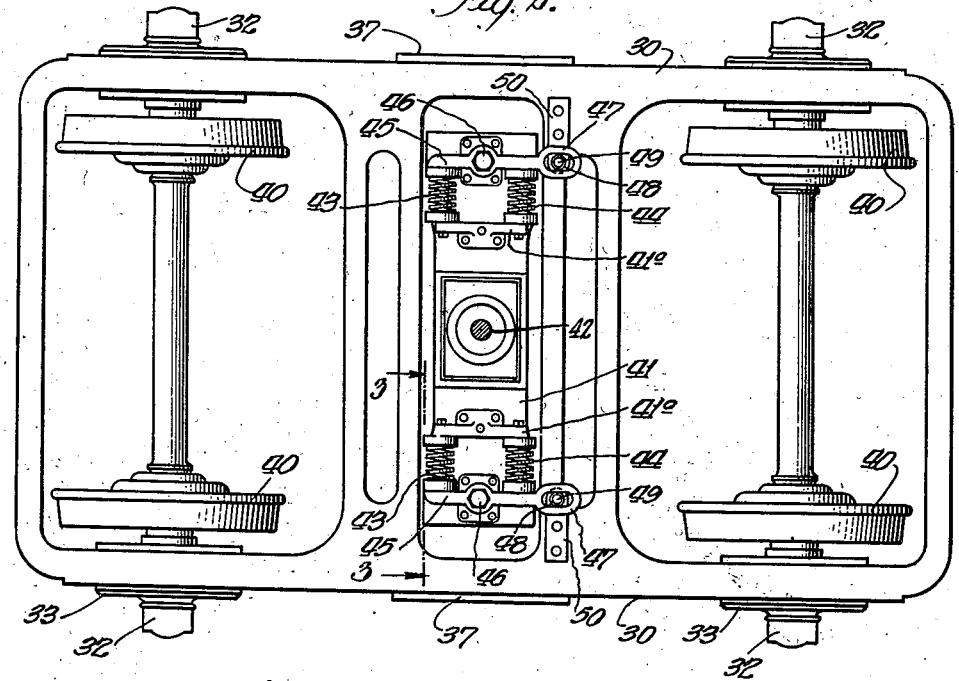
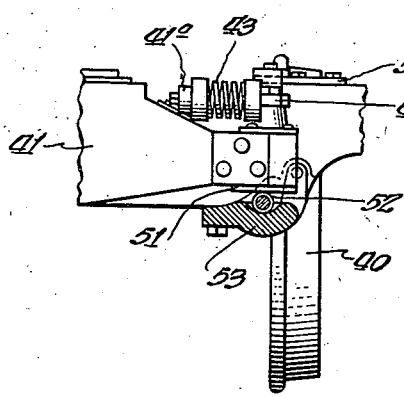
Inventor:
Frank M. White
By [signature]
Attorney.

Patented Jan. 5, 1943

2,307,439

UNITED STATES PATENT OFFICE 2,307,439

SPRING SUSPENSION FOR RAILWAY TRUCKS

Frank M. White, Chicago, Ill., assignor of one-fourth to Robert S. Smith, one-fourth to John K. Shuger, and one-fourth to Elmer E. Colby, all of Chicago, Ill.

Application June 21, 1940, Serial No. 341,730

3 Claims. (Cl. 105—194)

This invention relates to a shock-absorbing spring suspension, and for purposes of illustration it is herein shown as arranged for application to a truck of the type used in railway cars. One object of the invention is to absorb shocks and jolts transmitted to the wheels by unevenness on the road bed so that the force thereof shall not be transmitted to the vehicle frame and body. Another object is to provide a spring suspension having a minimum of points requiring lubrication. A further object is to provide a simple and sturdy construction which shall be economical to manufacture or repair. The invention consists of certain features and elements of construction in combination, as herein shown and described and as indicated by the claims.

In the drawing:

Figure 1 is a side elevation of a railway car truck with a spring suspension embodying this invention applied thereto.

Figure 2 is a partial top plan view of the truck showing the spring-controlled mounting of the bolster therein.

Figure 3 is a vertical section taken as indicated at line 2—2 on Figure 2.

The drawing shows a railway truck in which the main frame includes side members 30 and equalizer bars 31, the latter riding upon the journal boxes 32 which are guided for vertical movement between guides or "pedestals" 33 in the usual manner. The load is transmitted to the equalizer bar by springs 34, 34 resting thereon at longitudinally spaced points. Each of the springs 34 is interposed between the bar 31 and one end of a lever 35, said lever being fulcrumed at 36 on a special bracket 37 rigidly secured to the side member 30 of the truck frame. Movement of the lever 35 about its fulcrum 36 is controlled by a pair of springs 38 and 39 bearing respectively against the upper and lower sides of the lever 35 and at opposite sides of its fulcrum 36. Preferably, the distance between the spring 38 and the fulcrum 36 is the same as the distance between the spring 39 and said fulcrum, and said springs are of substantially equal stiffness, both acting in compression to oppose upward thrusts against the lever 38 which may be transmitted thereto through the spring 34 and equalizer bar 31 when the wheels 40 are subjected to shocks or bumps as they travel along the track. In some cases, such shocks are completely absorbed by the springs 34, but when this is not the case the levers 35 will rock slightly about their fulcrums 36 in response to vertical movement of the wheels 40, and within limits, there will be no vertical movement transmitted to the main truck frame 30, the springs 38 and 39 being suitably designed to carry the load and to flex through a limited range in thus absorbing irregularities of the track. The compressive forces exerted upon the springs 38 and 39 are absorbed as internal stresses in the frame 30 and bracket 37, which is made a rigid part thereof.

The main frame of the truck, which includes the side members 30, is connected to the car body, not shown, by means of a bolster 41, such connection including a king pin 42 to permit swiveling movement of the truck with respect to the car body. When the trucks are traversing curves or switches in the track, particularly when traveling at high speed, there will be lateral thrusts introduced between the truck frame and the bolster 41 as the trucks operate against the inertia of the body to change its direction of travel, and also as a result of centrifugal forces generated in traversing curves. To cushion and absorb these lateral forces the bolster is provided near each end with an abutment bracket 41a, bearing against a pair of coil springs 43, 44, which react against a lever 45 fulcrumed on a pivot 46, which is secured near the extreme end of the bolster. The springs 43, 44 bear upon a lever at opposite sides of its fulcrum 46, and, preferably, at equal distances therefrom, and one end of the lever is extended to form an elongated eye 47 which fits over a roller 48 on a stud 49, upstanding from a bracket 50 on the main truck frame. Thus any movement of the bolster 41 transversely in the truck frame operates to rock the lever 45 about its fulcrum 46, but such movement is resisted yieldingly by one of the springs, for example, 43, which tends to be compressed whenever the lever swings one way from its normal position in which both springs 43, 44 bear equally against it. At the opposite end of the bolster the same movement causes a corresponding rocking of the lever 45 and compression of the spring 44 at that end; whereas movement of the bolster in the opposite direction, and along its own longitudinal axis, will cause compression of the other pair of diagonally opposite springs 43 and 44 associated with the two levers 45. The springs 43 and 44 thus serve to cushion and absorb lateral forces so that sudden changes of direction of the trucks are transmitted gradually to the body, eliminating sudden shock or vibration, and resulting in a smooth, steady gliding movement of the car body. As indicated in Figure 3, the bolster 41 is provided on its under side at each end with a bearing plate 51 which rests upon a suitable roller 52, journaled in the bracket 53, which constitutes a portion of the main truck frame. Thus the slight transverse movement of the bolster which is permitted by the shock-absorbing springs 43, 44 is accomplished smoothly without any friction to cause squeaking or grinding of the engaged bearing surfaces.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim:

1. In a railway truck having a frame including a side member, two axles spaced apart longitudinally, journal bearings for said axles and an equalizer bar resting on said bearings, a pair of levers fulcrumed on the side member each having one end connected to the equalizer bar and two compression springs associated with each lever both seated on the side member, one of said springs bearing upwardly and the other bearing downwardly against the lever at opposite sides of its fulcrum respectively whereby said springs and levers serve to transmit the load from the side member to the equalizer bar.

2. In a railway truck having a frame including a side member, two axles spaced apart longitudinally, journal bearings for said axles and an equalizer bar resting on said bearings, a pair of levers fulcrumed on the side member with cushion springs interposed between one end of each lever and the equalizer bar, and a pair of compression springs associated with each lever both seated on the side member, one of said springs bearing upwardly and the other spring bearing downwardly on the lever at opposite sides of its fulcrum respectively for transmitting the load from the side member to the equalizer bar.

3. In a railway truck having a frame including a side member, two axles spaced apart longitudinally, journal bearings for said axles and an equalizer bar resting on said bearings, a bracket secured to the side member and depending therefrom, a pair of levers fulcrumed on said bracket and extending in substantially horizontal direction from their fulcrums, a coil spring disposed in compression between each of said levers and the bracket, a second coil spring for each lever disposed in compression between the lever and the side member at the other side of the lever fulcrum from the first-mentioned spring, and a third spring for each lever disposed in compression between the lever and the equalizer bar at a point beyond the second spring and near the end of said bar which rests upon the axle bearing.

FRANK M. WHITE.